US012103842B2

(12) United States Patent
Owens et al.

(10) Patent No.: US 12,103,842 B2
(45) **Date of Patent: *Oct. 1, 2024**

(54) DEVICES, SYSTEMS, AND METHODS FOR THERMALLY REGULATING AND DISPENSING BEVERAGES

(71) Applicant: VESTURE LLC, Charlotte, NC (US)

(72) Inventors: Byron Craig Owens, Asheboro, NC (US); Reyad I. Sawafta, Greensboro, NC (US)

(73) Assignee: VESTURE LLC, Asheboro, NC (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/872,728

(22) Filed: Jul. 25, 2022

(65) Prior Publication Data

US 2023/0016666 A1 Jan. 19, 2023

Related U.S. Application Data

(63) Continuation of application No. 16/486,437, filed as application No. PCT/US2018/018493 on Feb. 16, 2018, now Pat. No. 11,396,448.

(60) Provisional application No. 62/460,176, filed on Feb. 17, 2017.

(51) Int. Cl.

| | |
|---|---|
| ***B67D 7/80*** | (2010.01) |
| ***B65D 81/38*** | (2006.01) |
| ***B67D 1/06*** | (2006.01) |
| ***B67D 1/08*** | (2006.01) |

(52) U.S. Cl.
CPC ........... *B67D 7/80* (2013.01); *B65D 81/3897* (2013.01); *B67D 1/06* (2013.01); *B67D 1/0857* (2013.01)

(58) Field of Classification Search
CPC .......... B67D 7/80; B67D 1/06; B67D 1/0857; B67D 1/08; B65D 81/3897; B65D 81/38
See application file for complete search history.

(56) References Cited

U.S. PATENT DOCUMENTS

| | | | | |
|---|---|---|---|---|
| 1,735,832 A * | 11/1929 | Martin, Jr. | B65D 81/3897 | 62/372 |
| 4,196,817 A * | 4/1980 | Moser | F25D 31/007 | 215/396 |
| 4,595,101 A * | 6/1986 | Rivera | B65D 81/3897 | 383/110 |
| 5,005,374 A * | 4/1991 | Spitler | F25D 3/08 | 383/110 |
| 5,501,338 A * | 3/1996 | Preston | B65D 21/0213 | 294/149 |
| 5,595,320 A | 1/1997 | Aghassipour | | |
| 6,128,915 A | 10/2000 | Wagner | | |

(Continued)

*Primary Examiner* — Donnell A Long
(74) *Attorney, Agent, or Firm* — TILLMAN WRIGHT, PLLC; Chad D. Tillman

(57) ABSTRACT

Devices, systems, and methods for thermally regulating and dispensing beverages are described herein. More particularly, in one aspect, jackets for thermally regulating a beverage container are described. Such a jacket can comprise an interior temperature control layer defining an interior space for receiving the beverage container, and an exterior fabric layer disposed over the interior temperature control layer. The interior temperature control layer comprises a first phase change material (PCM) having a first phase transition temperature corresponding to a desired service temperature of a beverage contained in the beverage container.

5 Claims, 9 Drawing Sheets

(56) References Cited

U.S. PATENT DOCUMENTS

| | | | | |
|---|---|---|---|---|
| 6,729,758 | B1 | 5/2004 | Carter | |
| 11,396,448 | B2 | 7/2022 | Owens | |
| 2005/0236428 | A1* | 10/2005 | Quigley | B65D 75/5883 222/323 |
| 2007/0051125 | A1 | 3/2007 | Chiusolo | |
| 2009/0238939 | A1* | 9/2009 | Machado | B65D 81/3897 383/110 |
| 2014/0131372 | A1 | 5/2014 | Hiner | |
| 2014/0298852 | A1 | 10/2014 | Rodriguez | |
| 2015/0354885 | A1* | 12/2015 | Rasmussen | F25D 5/02 62/4 |

* cited by examiner

DEVICES, SYSTEMS, AND METHODS FOR THERMALLY REGULATING AND DISPENSING BEVERAGES

BACKGROUND OF THE INVENTION

The instant subject matter generally relates to thermal regulation, and more particularly to devices, systems, and methods for thermally regulating and dispensing beverages.

Caterers, beverage producers, and others in the beverage industry dispense their beverages in indoor and/or outdoor environments (e.g., at festivals or catering events), including when the weather is particularly hot or cold. For beverages that are to be served cold, such as beer, a traditional approach includes dispensing the beverage from a beverage container (e.g., a keg) via a $CO_2$ cartridge, while the beverage container is placed in an ice bath (e.g., a large bucket or tub filled with ice). In the case of beer, the beverage is often further routed from the keg to a so-called "jockey box" for additional cooling of the beer prior to dispensing and serving.

A common jockey box consists of a cooler (e.g., a rectangular cooler, such as an IGLOO® cooler) with two holes or openings drilled in the sides, one opening serving as an "inlet" and the other opening serving as an "outlet." A coil (e.g., a metal coil, a stainless steel coil, an aluminum coil, etc.) is placed inside the jockey box between the inlet and outlet so that beer flows into the inlet of the jockey box from the keg and out of the jockey box via the outlet, which is connected to a tap. The jockey box is also filled with ice for cooling the beverage as it flows through the coils between the keg and the tap.

There are many problems associated with this traditional approach. For example, in hot weather and/or for long service times, the ice in the ice bath and jockey box must frequently be replaced, which is not always easy (e.g., at outdoor festivals during the summer). Large amounts of ice are also heavy and expensive. The large amounts of ice used in the keg tub and/or the jockey box can melt, thus causing condensation, and/or leaking as it melts. As a result, a great deal of undesired water is released into the environment, causing puddles, generating mud in outdoor environments, and potentially damaging floors in indoor environments. Some indoor venues have started banning the use of ice by outside caterers and the like for at least these reasons. Another drawback to using ice is the inability of ice to provide any temperature other than 32° F.

Accordingly, a need exists for improved devices, systems, and methods of for thermally regulating and dispensing beverages from a beverage container. Such technology obviates the need for ice, and advantageously allows cold and/or hot beverages to be served at more precise temperatures.

SUMMARY OF THE INVENTION

Devices, systems, and methods of thermally regulating and dispensing beverages are disclosed.

Briefly, in one aspect, a device for thermally regulating a beverage comprises a jacket. The jacket comprises an interior temperature control layer defining an interior space for receiving a beverage container. The interior temperature control layer comprises a first phase change material (PCM) having a first phase transition temperature corresponding to a desired service temperature of a beverage contained in the beverage container. The jacket further comprises an exterior fabric layer disposed over the interior temperature control layer.

In further aspects, a device for thermally regulating a beverage comprises a beverage jockey (also referred to herein as a "jockey"). An exemplary beverage jockey comprises a container having one or more inlets, one or more outlets, and one or more conduits disposed in the container, the conduits connect an inlet and an outlet, and one or more PCMs disposed in the container and in thermal contact with the conduit. At least a first PCM is disposed in the container and has a first phase transition temperature that corresponds to a desired service temperature of at least one beverage received at the inlet.

In yet further aspects, systems for thermally regulating a beverage contained in a beverage container are disclosed. Such a system comprises a jacket and a jockey. The jacket can comprise an interior temperature control layer defining an interior space for receiving a beverage container, the interior temperature control layer comprising a first PCM having a phase transition temperature corresponding to a desired service temperature of the beverage contained in the beverage container. The jockey can comprise a container having an inlet and an outlet, a conduit disposed in the container, the conduit connecting the inlet and the outlet, and a first jockey PCM disposed in the container and in thermal contact with the conduit. The first jockey PCM has a phase transition temperature that corresponds to the desired service temperature of the beverage.

Notably, the first PCM forming the first temperature control layer and the jockey PCM are not ice. Each of the first PCM and the jockey PCM can have a phase transition temperature that is greater than 32° F., and in some embodiment, each PCM has a phase transition temperature of between about 33° F. and 200° F.

These and other embodiments are described in more detail in the detailed description which follows.

DETAILED DESCRIPTION

Figure 1:
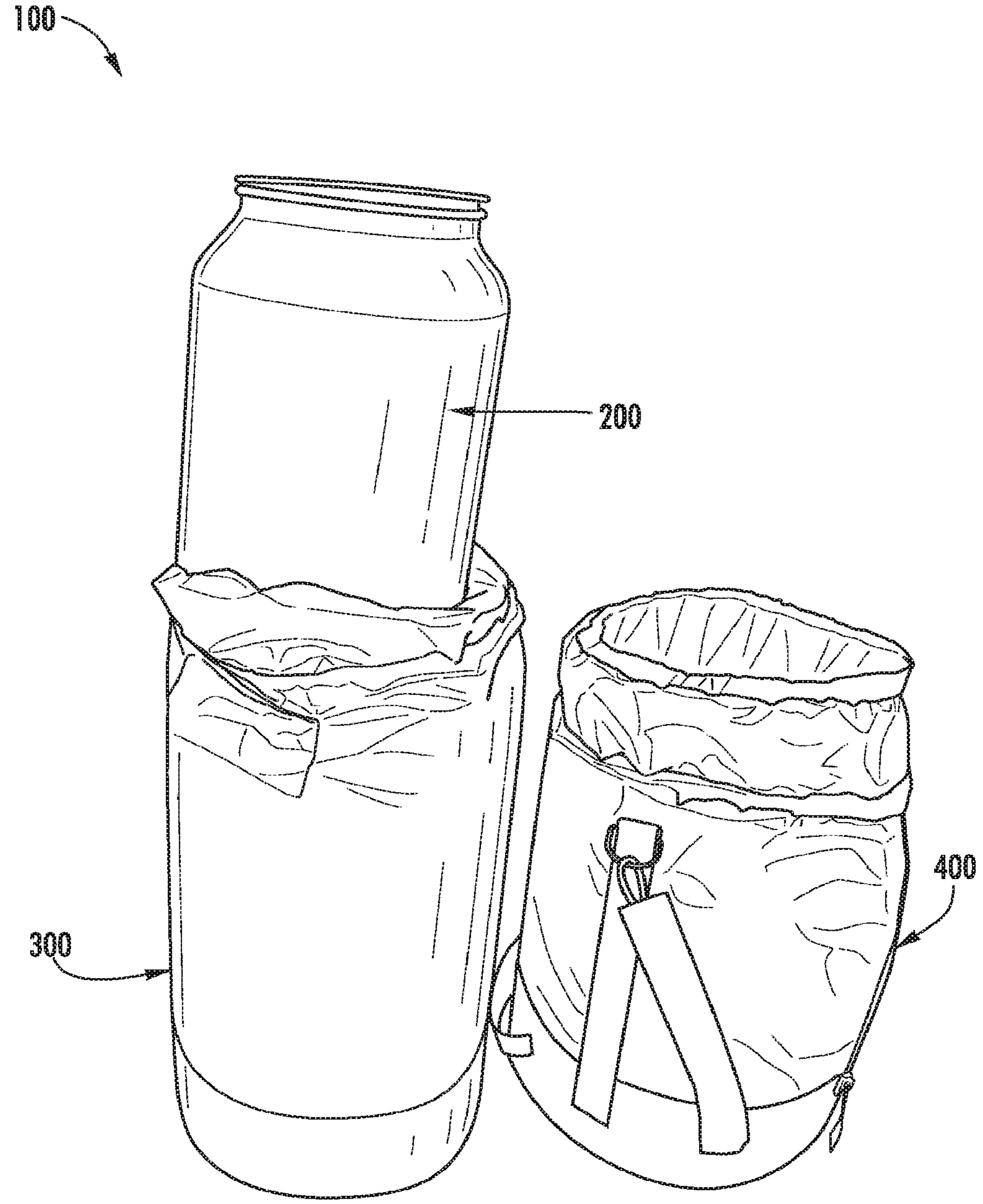
FIG. 1 illustrates a perspective view of a system for thermally regulating and dispensing a beverage according to one embodiment described herein.

Implementations described herein can be understood more readily by reference to the following detailed description, examples, and drawings. Devices, systems, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the scope of the instant disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10", "from 5 to 10", or "5-10" should generally be considered to include the end points of 5 and 10.

Further, when the phrase "up to" is used in connection with an amount or quantity; it is to be understood that the amount is at least a detectable amount or quantity. For example, a material present in an amount "up to" a specified amount can be present from a detectable amount and up to and including the specified amount.

I. Jackets for Thermally Regulating a Beverage Container

In one aspect, devices for thermally regulating a beverage container and/or a beverage disposed in the beverage container are described herein. Such devices can comprise jacket devices or "jackets", which at least partially cover, encase, or enclose a beverage container and/or a beverage jockey as described herein. In some cases, a jacket described herein covers, encases, or encloses at least 80%, at least 90%, or at least 95% of a beverage container and/or beverage jockey disposed in the jacket. In some instances, a jacket described herein completely covers, encases, or encloses the beverage container and/or beverage jockey, but with a snug fit, in which the beverage container or jockey occupies at least 80%, at least 90%, or at least 95% of the interior volume or space of the jacket. Such jackets include at least one temperature control layer facing the beverage container and/or the beverage jockey for regulating the temperature thereof and/or the beverage(s) or component(s) (e.g., conduits, coils, etc.) disposed therein or associated therewith. Notably, the devices, systems, and methods set forth herein obviate the need for providing and using ice as the first temperature control layer to thermally regulate beverages and/or beverage containers and, as such, are referred to as "iceless" in some embodiments. As described further below, the jackets set forth herein can advantageously thermally regulate the temperature of both hot and cold beverages in a beverage container and/or a beverage jockey, where desired.

Turning now to specific components of jackets that thermally regulate a beverage and/or a beverage container, such jackets can comprise a plurality of different layers and/or materials, where at least one layer is the innermost, interior temperature control layer and at least one other layer is an outermost, exterior fabric layer. One or more optional layers (i.e., intermediate layers) can be disposed between the interior temperature control layer and the external fabric layer, where desired.

The plurality of layers forming each jacket can be sewn, laminated, joined, or otherwise at least partially connected to form any suitable size (i.e., length, width or diameter, depth, etc.) and/or shape that will conform to any size and/or shape of beverage container or jockey that is not inconsistent with the objectives of the present disclosure. The term "beverage container" as used herein refers to any structure capable of housing, containing, retaining, and/or dispensing a liquid. Exemplary beverage containers include, but are not limited to beverage jockeys, kegs (i.e., a full keg), sixtel kegs (i.e., a sixth barrel), quarter barrels, half barrels, eighth barrels, slim quarters, mini-kegs, thermoses, gallon dispensers, liter dispensers, carafes, etc. The jackets set forth herein are flexible, foldable, stackable, and configured to open, close, seal, and/or conform to the exterior surfaces of beverage containers, including jockeys, for regulating the temperature thereof. Notably, such jackets can thermally regulate the temperature of a beverage container so that a beverage disposed therein can be dispensed and served at a precise, targeted service temperature including hot temperatures (e.g., between 100 and 200° F.), warm temperatures (e.g., between 55 and 95° F.), and/or cold temperatures (e.g., between 33 and 50° F.).

The interior temperature control layer forms an innermost layer of a jacket and defines an interior space for receiving a given beverage container (e.g., keg, beverage jockey, etc.). The interior temperature control layer is located adjacent to the beverage container for thermally regulating the temperature thereof. The interior temperature control layer comprises a first phase change material (PCM) having a first phase transition temperature corresponding to a desired service temperature of a beverage contained in the beverage container. That is, the first phase transition temperature is the same as (i.e., equal to) the desired service (consumption) temperature of the beverage in the beverage container.

In exemplary embodiments, the beverage is water having a service temperature of between about 33-36° F., lemonade having a service temperature of between about 36-38° F., soda having a service temperature of between about 36-40°

F., beer or cider having a service temperature of between about 40-44° F., and/or hot tea/coffee having a service temperature of between about 160-185° F. Notably, the first PCM is not ice, and has a first phase transition temperature that is greater than 32° F. For example and in some embodiments, the first phase transition temperature is between about 33 and 200° F. In certain embodiments, the first phase transition temperature ranges between about 33 and 44° F. or between 160 and 185° F.

The first PCM forming the interior temperature control layer of jackets described herein can comprise or be formed from any organic or inorganic material or compound that is not inconsistent with the objectives of the present disclosure. In some embodiments, the first PCM comprises a natural or synthetic wax, paraffin, a polymeric material, a salt hydrate, a fatty acid, a derivative of a fatty acid (e.g., an alkyl ester of a fatty acid), a fatty carbonate ester, sulfonate, phosphonate, a fatty alcohol, or a mixture thereof. An inorganic salt hydrate may also serve as a PCM described herein. More generally, as understood by one of ordinary skill in the art, a PCM is a material having a relatively large latent heat or enthalpy of fusion (or other enthalpy associated with a different phase transition), such that the PCM can store and/or release significant amounts of thermal energy via one or more phase transitions. In some cases, a PCM described herein has a phase transition enthalpy (e.g., a heat of fusion) of at least 150 kJ/kg or at least 200 kJ/kg.

Notably, unlike ice, the first PCM can thermally regulate a beverage so that the beverage can be dispensed at a targeted, precise service temperature or range of service temperatures. In certain embodiments, emulsifiers, thickening agents, cross linkers, fire retardants and/or extinguishers are optionally added as components of the first PCM. In an exemplary implementation, the phase change component of the first PCM has a gel physical state at 27° C., a density in a range of 0.8 to 0.9, and a boiling point above 249° C. The first PCM can, in some embodiments, be fabricated in accordance with the disclosure of U.S. patent application Ser. No. 12/448,001 (i.e., published as U.S. Pub. No. 2010/0127000), filed on Jan. 17, 2008, and/or the disclosure of International Patent Application No. PCT/US2012/055500 (i.e., published as WO 2013/040404), filed on Sep. 14, 2012, each of which is hereby fully incorporated herein by reference in the entirety.

Further, the first PCM may take any suitable form of known phase change materials, and thus in at least one of its phases may be in a granular or powder form, a gel, or a liquid. An example first PCM suitable for use in any of the embodiments described herein is a material marketed by Phase Change Energy Solutions, Asheboro, N.C., USA, as BioPCM™ or ThermaMat™. The first PCM may be a solid or a gel above or below the first transition temperature.

Still referring to jackets for thermally regulating a beverage container and/or beverages or components disposed therein, and as noted above, such jackets include an exterior fabric layer. The exterior fabric layer can be disposed on or over portions of the interior temperature control layer. In certain embodiments, the exterior fabric layer is light reflective and thus, also reflective of radiant heat, which allows the beverage container disposed in the jacket to remain warmer or cooler for longer periods of time.

In some embodiments, the exterior fabric layer is a woven fabric that is at least partially metallized. Such fabrics are lightweight, breathable, reusable, durable, washable, and easily sewn. Such fabrics reflect at least about 90% of radiant light and heat, at least about 95% of radiant light and heat, or at least about 98% of radiant light and heat. The exterior fabric layer of jackets set forth herein can comprise aluminum (Al). The Al can be visibly disposed on a single side, multiple sides, and/or comprise Al fibers that are woven throughout the fabric, where desired. In certain embodiments, the exterior fabric layer is opaque and has a metallic appearance.

Jackets described herein can further comprise one or more zippers whereby the jacket can expand and open via unzipping and then tighten and close via zipping around a beverage container for sealing the beverage container in the interior space. The temperature control layer of the jacket can be disposed directly adjacent to the beverage container received in the interior space. The teeth or track of the one or more zippers can compress and bind the plurality of jacket layers between the interior temperature control layer and the exterior fabric layer. The one or more zippers and/or the one or more zipper tracks can extend substantially parallel to a central longitudinal axis of the elongated jacket and substantially perpendicular to the jacket's width or diameter. The jacket can easily zip/unzip for improved, simplified insertion and removal of the beverage container in the interior space defined by the jacket.

Moreover, an optional drawstring can be disposed at one or both ends of the jacket allowing the jacket to entirely enclose the beverage container for improved temperature maintenance, including by providing a more "conformal" covering of the beverage container. One or more openings and/or flaps can optionally be formed or disposed in the jacket, allowing a user to easily access handles of the beverage container disposed in the jacket. For example, one or more handles disposed on a keg, a sixtel keg, or other type of beverage container or dispenser can be accessed via folding the one or more flaps open and exposing the handles through the openings defined by the flaps.

The flaps may optionally be opened/closed and partially sealed via a fastening member or region. For example, the flaps may be opened/closed and sealed via fastening members comprised of hook-and-loop fasteners (i.e., Velcro), buttons, zippers, straps, etc. Moreover, the jackets set forth herein can comprise one or more optional straps (e.g., backpack type straps) allowing a single user/person to easily carry the jacket and beverage container (e.g., keg, jockey, etc.), and optionally a system comprised of the jacket, a beverage container, and a jockey, while maintaining the beverage within the container at a desired dispensing temperature. The straps may be adjustable to accommodate the size of the user.

The jackets described herein include at least the interior temperature control layer and the exterior fabric layer. Such jackets can further comprise one or more optional intermediate layers disposed between the interior temperature control layer and the exterior fabric layer. Although optional, the intermediate layers may impart additional thermal insulating benefits that further improve the thermal management of a beverage in a beverage container. For example and in some embodiments, the jackets can comprise a second temperature control layer disposed between the first temperature control layer and the exterior fabric layer. The second temperature control layer can comprise a second PCM having a second phase transition temperature. The second phase transition temperature can be the same as (i.e., equal) or different than the first phase transition temperature of the first PCM. For example and in some embodiments, the second phase transition temperature is higher or lower than the first phase transition temperature.

In some embodiments, the second temperature control layer is provided directly adjacent to the first temperature control layer. Where the first temperature control layer serves as a heating or warming layer to thermally regulate the temperature of a beverage having a warm or hot service temperature, the second temperature control layer can have a higher phase transition temperature than the first phase transition temperature for slowing down the cooling rate of the first temperature control layer. Similarly, where the first temperature control layer serves as a cooling layer to thermally regulate the temperature of a beverage having a cool/cold service temperature, the second temperature control layer can have a lower phase transition temperature than the first phase transition temperature for slowing down the warming rate of the first temperature control layer.

Where multiple temperature control layers are provided, the second phase transition temperature can be at least about +/−2° F. different than the first phase transition temperature, at least about +/−5° F. different than the first phase transition temperature, at least about +/−8° F. different than the first phase transition temperature, at least about +/−10° F. different than the first phase transition temperature, or between about +/−20° F. different than the first phase transition temperature. In some embodiments, the first phase transition temperature is between 33 and 50° F. and the second phase transition temperature is between 0 and 32° F. In other embodiments, the first phase transition temperature is between 33 and 44° F. and the second phase transition temperature is between 20 and 32° F. In further embodiments, the first phase transition temperature is between 160 and 185° F. and the second phase transition temperature is between 165 and 200° F.

The second PCM forming the second temperature control layer can comprise ice, an ice pack, an aqueous glycol mixture, hot water, a salt hydrate solution, a sodium acetate solution, a layer of metal or a metal alloy, a sodium nitrate solution, a potassium nitrate solution, an organic solution, an inorganic solution, an oil or grease, a wax (e.g., paraffin), a fatty acid, a plant oil solution, etc. In some cases, ice is not used. Notably, the second temperature control layer can advantageously increase the latent energy capacity and mass of the jacket, which reduces the rate at which the first temperature control layer gains or loses heat. Thus, the jacket can be used to thermally regulate beverages and/or beverage containers for longer periods of time than traditional materials, for example, and maintain a beverage at a desired service temperature, or within a desired service temperature range, for at least 3 hours, at least 4 hours, at least 5 hours, at least 8 hours, or between about 3 and 12 hours.

Jackets for thermally regulating a beverage container and/or a beverage disposed in the container can further comprise an insulating layer disposed between the interior temperature control layer and the exterior fabric layer. This is an optional layer, which may further reduce the rate at which the first temperature control layer gains or loses heat. Where used, the insulation layer may be disposed adjacent to the exterior fabric layer. The insulating layer can comprise a reflective bubble material, a foam, an aerogel, or a fabric loaded with a foam or an aerogel. In certain embodiments, the R-value rating (per inch) of insulating materials forming one or more layers in the jackets described herein is at least R6 or higher.

It is understood that the jackets for thermally regulating beverage containers and/or beverages described herein can incorporate more than two intermediate layers between the first temperature control layer and the exterior fabric layer, where desired, without departing from the instant subject matter. For example, multiple intermediate layers may include second and third temperature control layers, more than one insulating layer, more than one reflective layer, or any other materials or layer that increase the latent energy capacity of the jacket that are not inconsistent with the objectives of the present disclosure.

It is further understood that the jackets described herein can have any combination of properties and/or features described hereinabove not inconsistent with the objectives of the present disclosure.

II. Methods of Using a Jacket to Thermally Regulate a Beverage

In another aspect, methods of using a jacket to thermally regulate a beverage container and/or a beverage disposed in the beverage container are described herein. In some embodiments, such a method comprises disposing a beverage container in an interior space of a jacket. The jacket can comprise any of the layers and/or materials described hereinabove in Section I. For instance, in some cases, the jacket comprises at least a first temperature control layer that defines the interior space and faces the beverage container. The first temperature control layer comprises a first PCM having a first phase transition temperature that is the same as the service temperature of the beverage. The jacket can include at least one exterior layer and one or more additional (i.e., optional) intermediate layers disposed between the interior temperature control layer and the exterior layer.

Further, the methods of thermally regulating a beverage container and/or a beverage therein comprise unzipping the jacket to enlarge the interior space, placing the beverage container in the interior space while the jacket is unzipped, and then zipping the jacket over and/or around the beverage container to at least partially seal the beverage container in the interior space. When in the interior space, the first temperature control layer can contact at last some of the exterior surfaces of the beverage container for regulating the temperature thereof, so that the beverage in the container will be dispensed and served at a service temperature corresponding to the first phase transition temperature. As noted in Section I above, in exemplary embodiments the first phase transition temperature ranges between about 33 and 200° F., for example, between about 33 and 44° F. or between about 160 and 185° F.

Methods of thermally regulating a beverage container and/or a beverage therein can further comprise cinching a drawstring of the jacket to tighten the jacket around the beverage container, or portions thereof.

Such methods can further comprise aligning one or more handles of a beverage container with one or more flaps in the jacket, and covering the handles with the flaps. Notably, the beverage container can be fully enclosed, encased, or otherwise disposed in the jacket. That is, the jacket can form a conformal layer of material over the beverage container for regulating the temperature of the container, and reducing the rate at which the first temperature control layer gains or loses heat. Reducing the rate at which the first temperature control layer gains or loses heat is advantageous, as the jacket can be used in indoor and/or outdoor settings in beverage dispensing system for longer periods of time than previously thought possible, in some embodiments without the need for ice and/or without the need for replacing ice.

(49) In some embodiments, the jacket conforms to the shape of the beverage container so that the interior temperature control layer covers and/or contacts at least 50% of the exterior surface of the beverage container, at least 80% of the exterior surface of the beverage container, at least 90% of the exterior surface of the beverage container, or 100% of the exterior surface of the beverage container. That is, in some embodiments, the jacket covers and/or contacts the entire exterior surface of the beverage container, while other components that are attached to the exterior surface of the container, including, but not limited to coils, tubes, fittings, conduits, cartridges, manifolds, and/or beverage dispensers (e.g., tap, spigot, etc.) may be left uncovered.

The methods of thermally regulating a beverage container can further comprise thermally regulating a beverage container such as a keg, a sixtel keg, a thermos, a gallon or liter tea or coffee dispenser, or any other type of beverage container that is not inconsistent with the objectives of the instant disclosure. Such methods can comprise dispensing the beverage from the beverage container at a service temperature corresponding to the first phase transition temperature of the first PCM forming the interior temperature control layer of the jacket.

It is understood that the methods of using jackets to thermally regulate beverage containers and/or beverages described herein can incorporate additional, optional steps and/or combine steps, where desired, without departing from the instant subject matter. It is further understood that a method of using a jacket described herein can have any combination of properties or features described herein not inconsistent with the objectives of the present disclosure.

III. Beverage Jockeys

In a further aspect, beverage jockeys are described herein. Beverage jockeys are configured to house or contain a beverage as it flows therethrough, and are one form of a beverage container that is thermally regulated via the jackets described hereinabove in Section I. Beverage jockeys can comprise a container having an inlet and an outlet, a conduit disposed in the container, and a first PCM disposed in the container and in thermal contact with the conduit The conduit connects the inlet and the outlet. Notably, the first PCM is a jockey PCM having a first phase transition temperature that corresponds to (i.e., matches and/or is the same as) a desired service temperature of a beverage received at the inlet. Beverage jockeys are configured to input and output one or more beverages including but not limited to beer, wine, water, lemonade, soda, juice, coffee, cider, tea, or fermented tea.

A "conduit," for reference purposes herein, comprises one or more tubes, pipes, coils, hoses, housings, or chambers adapted to receive, distribute, transport, and/or discharge a beverage. Additionally, two components in "thermal contact" with one another, for reference purposes herein, are able to exchange energy with one another through the thermodynamic process of heating with a thermal efficiency of at least about 80 percent, at least about 90 percent, or at least about 95 percent.

Turning now to specific components of jockeys described herein, the first PCM (also referred to as the "jockey PCM") disposed in the container can comprise a natural or synthetic wax, paraffin, a polymeric material, a salt hydrate, a fatty acid, a derivative of a fatty acid (e.g., an alkyl ester of a fatty acid), a fatty carbonate ester, sulfonate, phosphonate, a fatty alcohol, or a mixture thereof. Notably, unlike ice, the first PCM can thermally regulate a beverage so that the beverage can be dispensed at a targeted, precise service temperature or range of service temperatures. The first PCM is not ice.

In certain embodiments, emulsifiers, thickening agents, cross linkers, fire retardants and/or extinguishers are optionally added as components of the first PCM. In an exemplary implementation, the phase change component of the first PCM has a gel physical state at 27° C., a density in a range of 0.8 to 0.9, and a boiling point above 249° C. The first PCM can, in some embodiments, be fabricated in accordance with the disclosure of U.S. patent application Ser. No. 12/448,001 (i.e., published as U.S. Pub. No. 2010/0127000), filed on Jan. 17, 2008, and/or the disclosure of International Patent Application No. PCT/US2012/055500 (i.e., published as WO 2013/040404), filed on Sep. 14, 2012, each of which is hereby fully incorporated herein by reference in the entirety.

Further, the first PCM disposed in the container may take any suitable form of known phase change materials, and thus in at least one of its phases may be in a granular or powder form, a gel, or a liquid. An example first PCM suitable for use in any of the embodiments described herein is a material marketed by Phase Change Energy Solutions, Asheboro, N.C., USA, as BioPCM™or ThermaMat™. The first PCM may be a solid or a gel above or below the first transition temperature.

The first PCM disposed in the container (i.e., the jockey container) can occupy a continuous interior volume of the container around the conduit. Approximately 50 percent of the interior volume of the container can be occupied by the first PCM, while the remaining 50 percent is occupied by the conduit. Other distributions of tank volume are also possible. For example, in some instances, the first PCM occupies about 20 volume percent to about 90 volume percent, and the conduit occupies about 10 volume percent to about 80 volume percent, based on the total interior volume of the container and/or a sub-compartment of the container as described further below.

Moreover, the first PCM exhibits a first phase transition temperature. The first phase transition temperature corresponds to a desired service temperature of a beverage received at the inlet, contained in the conduit of the beverage jockey, and/or expelled from the outlet. That is, the first phase transition temperature is the same as (i.e., equal to) the desired service (consumption) temperature of the beverage flowing through the beverage jockey. In exemplary embodiments, the beverage passing through the beverage jockey is water having a service temperature of between about 33-36° F., lemonade having a service temperature of between about 36-38° F., soda having a service temperature of between about 36-40° F., beer or cider having a service temperature of between about 40-44° F., or hot tea/coffee having a service temperature of between about 160-185° F. Notably, the first phase transition temperature that is greater than 32° F. For example and in some embodiments, the first phase transition temperature is between about 33 and 200° F. In certain embodiments, the first phase transition temperature ranges between about 33 and 44° F. or between about 160 and 185° F.

As noted above, at least one conduit is provided in the interior space of the container (i.e., the jockey container) and connects the inlet and the outlet. A beverage flows through and/or may periodically reside in the conduit. The average residence time of the beverage in the conduit and/or jockey, in some embodiments, is between about 5 seconds and 1 hour, depending on the demand for the beverage. As described in more detail below, a single jockey container may include multiple inlets, multiple outlets, and multiple conduits connecting a respective inlet/outlet pair for dispensing multiple different beverages, where desired.

The conduit disposed in the beverage jockey can comprise any type and/or be formed from any material not inconsistent with the objectives of the present disclosure. In some embodiments, for example, the conduit is at least partially constructed of a thermally conductive material such as metal or a metal alloy. Other materials, such as plastic or polymeric materials may also be used to construct the conduit. A "thermally conductive" material, for reference purposes herein, is more conductive than insulating at temperatures encountered during normal use of the beverage jockey, such as between about 30° F. and about 200° F.

Further, the conduit connects the inlet and the outlet of the container. In some embodiments, the inlet of the beverage jockey is in fluid communication with a beverage container (e.g., a keg, sixtel keg, coffee/tea dispensing container, etc.) and the outlet of the beverage jockey is in fluid communication with a beverage dispensing apparatus (e.g., a tap, a nozzle, a spigot, etc.). In an exemplary embodiment, the inlet of the beverage jockey is connected to a keg or a sixtel keg and the outlet either forms a tap or is connected to a tap.

Beverage jockeys described herein can be thermally regulated via the jackets described hereinabove in Section I. For example, the beverage jockey container can be disposed in a jacket that comprises an internal temperature control layer and an external fabric layer as described in Section I. The internal temperature control layer can be disposed directly adjacent to the jockey container. The jacket can further comprise a second temperature control layer formed from a second PCM that has a second phase transition temperature as described hereinabove in Section I. In some embodiments, the second phase transition temperature is the same as the first phase transition temperature. In other embodiments, the second phase transition temperature is the different than (i.e., lower, or higher than) the first phase transition temperature.

In further embodiments of the beverage jockeys described herein, the jockey container can optionally be subdivided into a plurality of internal sub-compartments and include a plurality of conduits connecting a plurality of inlets and a plurality of outlets. Subdividing the jockey container advantageously allows a plurality of different beverages to be routed therethrough, for example, between a plurality of beverage containers (e.g., a plurality of kegs, sixtel kegs, soda/lemonade containers, tea/coffee containers, water containers, combinations thereof, etc.) and a plurality of beverage dispensing apparatuses (e.g., a plurality of nozzles, spigots, taps, combinations thereof, etc.).

Each of the plurality of internal sub-compartments can be thermally isolated from each of the remaining sub-compartments for thermally regulating the sub-compartment and a specific beverage passing through the sub-compartment via a specific conduit. The thermal regulation of each sub-compartment can be provided by a respective PCM. For example, a first PCM disposed in a first sub-compartment has a first phase transition temperature that matches the service temperature of a first beverage disposed in and flowing through the first sub-compartment. Two, three, or more than three respective sub-compartments, conduits, and PCMs can be provided in a single jockey, where desired, and not inconsistent with the objectives of the instant disclosure.

Each of the plurality of conduits can be disposed in one of the internal sub-compartment between a respective inlet/outlet pair, which passes a given beverage therethrough. At least two sub-compartments may be provided per jockey container, at least three sub-compartments may be provided per jockey container, or more than three sub-compartments may be provided per jockey container. As persons having skill in the art will appreciate, a beverage jockey may only contain a single compartment or any number of multiple sub-compartments, where provision of such is not inconsistent with the objectives of the instant disclosure. Notably, a single beverage jockey can thermally regulate a plurality of different beverages to be dispensed at a plurality of different service temperatures via routing each beverage through a single, independent sub-compartment. Each independent sub-compartment comprises at least one PCM disposed therein, which has a phase transition temperature that matches the service temperature of the beverage passing through that individual sub-compartment. The phase transition temperature of the PCM in each sub-compartment is greater than 32° F.

In some embodiments, a plurality of PCMs can be disposed in one of the respective plurality of sub-compartments of a given jockey container. In certain embodiments, a first PCM having a first phase transition temperature is disposed in a first internal sub-compartment of the jockey container, a second PCM having a second phase transition temperature is disposed in a second internal sub-compartment of the jockey container, and a third PCM having a third phase transition temperature is disposed in a third internal sub-compartment of the jockey container. Each sub-compartment can comprise a same or a different PCM having a same or different phase transition temperature. In certain embodiments, the first phase transition temperature is between about 40-44° F., the second phase transition temperature is between about 36-38° F., and the third phase transition temperature is between about 33-36° F. Thus, the jockey is configured to thermally regulate beer, lemonade, and water via the respective first, second, and third sub-compartments. As persons having skill in the art will appreciate, different beverages and/or different types of beverages (e.g., different types of beer, different types/flavors of soda, etc.) may be routed through individual sub-compartments and thermally regulated via a single jockey.

In an exemplary embodiment, a single jockey is configured to thermally regulate the temperature of one beverage, two beverages, three beverages, four beverages, five beverages, six beverages, or more than six beverages. Such beverages may include any combination and/or flavor or type of beer, wine, soda, water, coffee, tea, etc., not inconsistent with the objectives of the instant disclosure. Such beverages can have different service or consumption temperatures that are thermally regulated via the single beverage jockey.

Beverage jockeys described herein may either be provided alone or in combination with other components to form a system for thermally regulating and dispensing beverages. The beverage jockeys described herein may optionally be disposed in a jacket according to Section 1 above. Further, the beverage jockeys described herein may also be stacked over a beverage container (e.g., a keg, sixtel keg, etc.). The jockey and beverage container may each be disposed in a single jacket, or the jockey and beverage container may be each be disposed in a different, separate jacket.

It is understood that the beverage jockeys described herein can have any combination of properties or features described herein not inconsistent with the objectives of the present disclosure.

IV. Methods of Dispensing Beverages Via Beverage Jockeys

In yet further aspects of the instant disclosure, methods of dispensing beverages via beverage jockeys are disclosed herein. Such a method includes providing a beverage jockey as described hereinabove in Section III, receiving a beverage at the inlet of the jockey, passing the beverage through the conduit of the jockey, and dispensing the beverage from the outlet of the jockey. The outlet may include and/or be connected to a tap, nozzle, spigot, or other apparatus that dispenses the beverage at a service temperature matching the phase transition temperature of the first PCM in the jockey (i.e., the jockey PCM) and/or the first phase transition temperature of the first temperature control layer in a jacket disposed around the jockey.

In certain embodiments, the method of dispensing a beverage from a beverage jockey comprises receiving and dispensing a beverage that may include, without limitation, beer, water, lemonade, soda, coffee, cider, tea, or fermented tea, and different types, flavors, or variations thereof (e.g., types of beer may include pale ale, lager, IPA, brown ale, etc.).

In optional embodiments, the method of dispensing a beverage via a beverage jockey further comprises subdividing the jockey container into a plurality of internal sub-compartments. Each sub-compartment can be thermally isolated from the other sub-compartments, where desired. A plurality of conduits can then be provided and disposed in a respective one of the internal sub-compartments between an inlet and an outlet of the jockey. Where multiple different beverages are dispensed from a single jockey, each of the different beverages may flow through a different conduit and be in fluid communication with one inlet/outlet pair. Further, where multiple beverages are dispensed from a single jockey, each respective beverage can flow through a respective conduit, which is provided in a specific sub-compartment and thermally regulated via a respective PCM having a respective phase transition temperature that is between about 33 and 200° F. The PCM in each conduit can be the same PCM or different PCMs.

In an exemplary embodiment, a method dispensing a beverage via a beverage jockey described herein comprise providing a first jockey PCM having first phase transition temperature in a first internal sub-compartment of the container of the jockey, providing a second jockey PCM having a second phase transition temperature in a second internal sub-compartment of the container of the jockey, and providing a third jockey PCM having a third phase transition temperature in a third internal sub-compartment of the container of the jockey. The first beverage is dispensed at the first phase transition temperature, the second beverage is dispensed at the second phase transition temperature, and the third beverage is dispensed at the third phase transition temperature. For exemplary purposes only, the first phase transition temperature is 40-44° F., the second phase transition temperature is 36-38° F., and the third phase transition temperature is 33-36° F. Beverages may be served at any of the service temperatures previously described in Sections I-III above. Such beverages can be served hot, warm, or cold.

It is understood that the methods of dispensing beverages via beverage jockeys described herein can incorporate additional, optional steps and/or combine steps, where desired, without departing from the instant subject matter. It is further understood that a method of using a beverage jockey described herein can have any combination of properties or features described herein not inconsistent with the objectives of the present disclosure.

V. Systems for Thermally Regulating a Beverage

In further aspects, systems for thermally regulating a beverage contained in a beverage container are disclosed. Such a system comprises a jacket and a jockey. The jacket can comprise any of the layers and/or materials described hereinabove in Section I. The jockey can comprise any of the aforementioned features described in Section III. In certain embodiments, the jacket is disposed on, over, and/or around portions of the beverage container, the jockey, or both. A single jacket can be disposed around both the jockey and the beverage container, or the jockey and the beverage container can each be disposed in a separate, individual jacket, where desired.

Turning now to exemplary system components, and as described in Section I above, a jacket can comprise an interior temperature control layer defining an interior space for receiving the beverage container. The interior temperature control layer comprises a first PCM having a first phase transition temperature corresponding to a desired service temperature of the beverage housed in the beverage container. The jockey can be disposed on or over the beverage container in some aspects. That is, the jockey can be stacked on top of the beverage container and the beverage can be dispensed from a spigot or tap extending from and/or connected to the jockey outlet.

Further, the jockey can comprise a first jockey PCM disposed in the jockey container and in thermal contact with the conduit, the first jockey PCM has a phase transition temperature that corresponds to the desired service temperature of the beverage. That is, the first phase transition temperature of the first PCM in the jacket can, but does not have to be, substantially equal the jockey PCM.

Where the jockey is disposed over the beverage container, a duct can be disposed therebetween for fluidly connecting the beverage container and the jockey. The duct is operable to connect an outlet of the beverage container to the inlet of the jockey. The beverage container can be disposed in a first jacket and the jockey can be disposed in a second jacket. Each jacket can comprise an internal temperature control layer and an external fabric layer. The internal temperature control layer of the second jacket can comprise a second jacket PCM having a phase transition temperature corresponding to the desired service temperature of the beverage contained in the beverage container.

It is understood that a beverage system as described herein can have any combination of properties or features described herein not inconsistent with the objectives of the present disclosure.

VI. Methods for Dispensing a Beverage from a Thermally Regulated System

In yet further aspects, methods for dispensing a beverage from a thermally regulated system are described herein. Such a method comprises providing a system according to Section V described above. The system can comprise a jacket, a jockey, and/or a beverage container. The jacket thermally regulates the temperature of the jockey and/or the beverage container. Such a method can further comprise dispensing the beverage from the outlet of the jockey.

The temperature at which the beverage is dispensed and served matches the phase transition temperature of the first PCM disposed in the jacket, the jockey PCM disposed in the jockey, and/or within +/−10° F. thereof. The service temperature of the beverage can be maintained for at least 3 hours, 4 hours, 5 hours, 6 hours, or between 3 and 12 hours. The first PCM and the jockey PCM are not ice, and each PCM has a phase transition temperature that is greater than 32° F. Methods set forth herein can be used to thermally regulate beverage containers and/or beverages including but not limited to beer, wine, cider (alcoholic or non-alcoholic), soda, lemonade, water (hot or cold), tea (hot, cold, or fermented), and/or coffee (hot or cold).

It is understood that the methods of dispensing beverages from a thermally regulated system described herein can incorporate additional, optional steps and/or combine steps, where desired, without departing from the instant subject matter. It is further understood that a method of using a system described herein can have any combination of properties or features described herein not inconsistent with the objectives of the present disclosure.

Some embodiments described herein are further illustrated in the following non-limiting examples.

Example 1

System for Thermally Regulating and Dispensing a Beverage

FIG. 1 is an exemplary embodiment of a system, generally designated 100, for thermally regulating a beverage contained in a beverage container. An exemplary system comprises a beverage jockey 200 and a jacket 300 disposed over a beverage container (i.e., 302, FIG. 2). An additional jacket 400 can be provided, where desired, that can be disposed over and around the beverage jockey 200.

(89) In certain embodiments, a first jacket (i.e., 300) is disposed around a beverage container (i.e., 302, FIG. 2) and a second jacket (i.e., 400) is disposed around beverage jockey 300, where desired. Each jacket 300, 400 can comprise a plurality of different layers formed from a plurality of different materials, where at least one layer comprises a temperature control layer (i.e., b, FIG. 3). The temperature control layer comprises and/or is formed from a first PCM having a first phase transition temperature that matches a service temperature of the beverage disposed in the beverage container. The first PCM is not ice, and the first transition temperature is greater than 32° F. In some embodiments, the first phase transition temperature is between about 33 and 200° F., such as between about 33 and 44° F., between about 160 and 185° F., or any subrange therebetween.

As FIG. 1 illustrates, beverage jockey 200 can optionally be stacked on top of the beverage container 300 during use. A jockey PCM (not shown) can be disposed in the beverage jockey 200 and in thermal contact with a conduit (e.g., 210, FIG. 5C) disposed inside jockey 200. The jockey PCM can be formed from any material having a phase transition temperature that is between about 33 and 200° F., and the jockey PCM is not ice. The jockey phase transition temperature can match the temperature of the beverage passing therethrough and/or the beverage being expelled from a jockey outlet.

Example 2

Jackets for Thermally Regulating a Beverage Container and/or a Beverage

Figure 2:
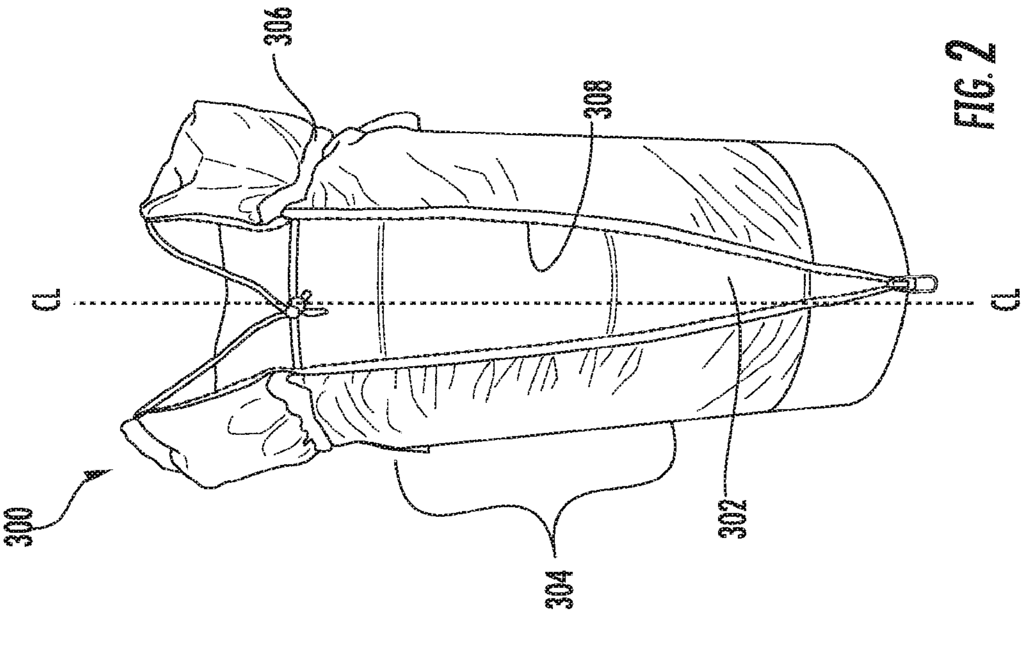
FIG. 2 illustrates a perspective view of a jacket for thermally regulating and dispensing a beverage according to one embodiment described herein, wherein the jacket is shown in an open configuration.

FIG. 2 is a perspective view of a beverage container 302 disposed inside jacket 300. Jacket 300 thermally regulates beverage container 302 and/or a beverage disposed therein. In FIG. 2, the jacket 300 is shown in an open (i.e., unzipped) configuration. In certain embodiments, beverage container 302 comprises a keg, or a container that is a fraction of a keg (e.g., a half barrel, a quarter barrel, a sixtel, an eighth barrel, etc.).

Jacket 300 comprises a body 304 formed from a plurality of different layers and/or materials. The innermost layer of jacket 300 defines an interior space for receiving beverage container 302. Jacket 300 can comprise one or more optional fastening or tightening members by which it can tighten and seal around and/or against container 302 surfaces for improved thermal regulation and heat (thermal energy) exchange.

In some embodiments, a first tightening member comprises a drawstring 306 disposed at one or both ends and a second tightening member comprises a zipper 308. Jacket 300 can be cinched around the upper portion of container 302 via drawstring 306 and sealed against container 302 surfaces via zipper 308. Jacket 300 conforms to and/or contacts the exterior surfaces of container 302 for improved thermal regulation and heat exchange. The zipper 308 track can be disposed substantially parallel to a central axis CL of jacket 300 and orthogonal to a beverage container 302 diameter.

Figure 3:
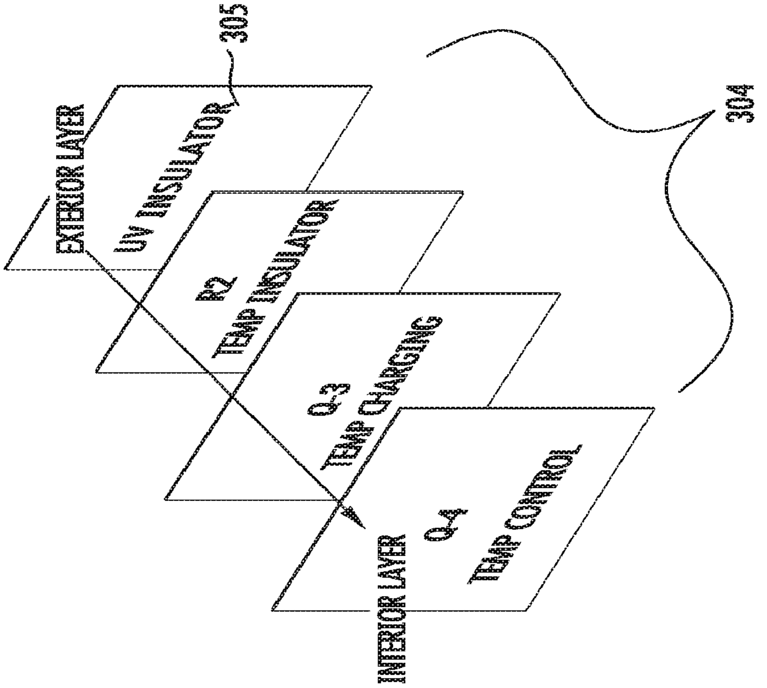
FIG. 3 illustrates an exploded view of the materials forming a jacket for thermally regulating and dispensing a beverage according to one embodiment described herein.

FIG. 3 is an exploded view of the materials forming jacket 300. Jacket 300 includes a jacket body 304 formed from one or more layers of material. Jacket 300 comprises at least one interior temperature control layer Q4 defining an interior space for receiving the beverage container. The interior temperature control layer Q4 is closest to the beverage container (i.e., 302, FIG. 2) and comprises a first phase change material (PCM) having a first phase transition temperature corresponding to a desired service temperature of a beverage contained in the beverage container (i.e., 302, FIG. 2). In an exemplary embodiment, interior temperature control layer Q4 can comprise a gelled BioPCM™ marketed by Phase Change Energy Solutions headquartered in Asheboro.

Jacket 300 further comprises an exterior fabric layer 305 that forms an outermost layer thereof. Fabric layer 305 layer is disposed over portions of interior temperature control layer Q4. In certain embodiments, exterior fabric layer 305 is light reflective and thus, also reflective of radiant heat, which allows a beverage container (i.e., 302, FIG. 2) disposed inside jacket 300 to remain warmer or cooler for longer periods of time. In some embodiments, the exterior fabric layer is a woven fabric that is at least partially metallized (e.g., with a metal or metal alloy, such as Al). Such fabrics are lightweight, breathable, reusable, durable, washable, and easily sewn. Such fabrics reflect at least about 90% of radiant light and heat.

Jacket 300 can optionally comprise one or more intermediate layers disposed between interior temperature control layer Q4 and exterior fabric layer 305. Where desired, a second temperature control layer Q3 can be disposed directly adjacent and in contact with interior temperature control layer Q4. Second temperature control layer Q3 can comprise or be formed from a second PCM having a second phase transition temperature. The second PCM has a second temperature control layer that can comprise ice, an ice pack, an aqueous glycol mixture, hot water, a salt hydrate solution, a sodium acetate solution, a layer of metal or a metal alloy, a sodium nitrate solution, a potassium nitrate solution, an organic solution, an inorganic solution, an oil or grease, a wax (e.g., paraffin), a fatty acid, a plant oil solution, etc. Notably, second temperature control Q3 layer can advantageously increase the latent energy capacity and mass of the jacket, which reduces the rate at which the first temperature control layer gains or loses heat. The second phase transition temperature can be equal to, higher than, or lower than the first phase transition temperature of the first PCM forming interior temperature control layer Q4.

Where first temperature control layer Q4 serves as a heating layer to thermally regulate the temperature of a beverage having a warm or hot service temperature, second temperature control layer Q3 can have a higher phase transition temperature than the first phase transition temperature for slowing down the cooling rate of the first temperature control layer. Where the first temperature control layer Q4 serves as a cooling layer to thermally regulate the temperature of a beverage having a cool/cold service temperature, second temperature control layer Q3 can have a lower phase transition temperature than the first phase transition temperature for slowing down the warming rate of the first temperature control layer. One, two, or more than two temperature control layers may be provided, where desired.

Where multiple temperature control layers are provided (i.e., Q3, Q4, etc.), the second temperature control layer Q3 can comprise a phase transition temperature that is at least about +/−2° F. different than the first phase transition temperature, at least about +/−5° F. different than the first phase transition temperature, at least about +/−8° F. different than the first phase transition temperature, at least about +/−10° F. different than the first phase transition temperature, or between about +/−20° F. different than the first phase transition temperature. In an exemplary embodiment, second temperature control layer Q4 can comprise a glycol mix PCM.

A further intermediate layer can comprise a temperature insulating layer R2. This is an optional layer, which may further reduce the rate at which the first temperature control layer gains or loses heat. Where used, insulation layer R2 may be disposed adjacent to exterior fabric layer 305. Insulating layer R2 can comprise a reflective bubble material, a foam, an aerogel, or a fabric loaded with a foam or an aerogel.

Figure 4A:
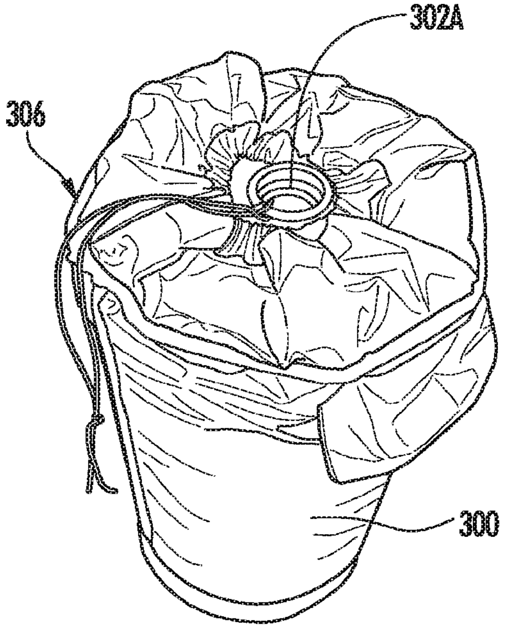
FIG. 4A illustrates a perspective view of a jacket for thermally regulating and dispensing a beverage according to one embodiment described herein.
Figure 4B:
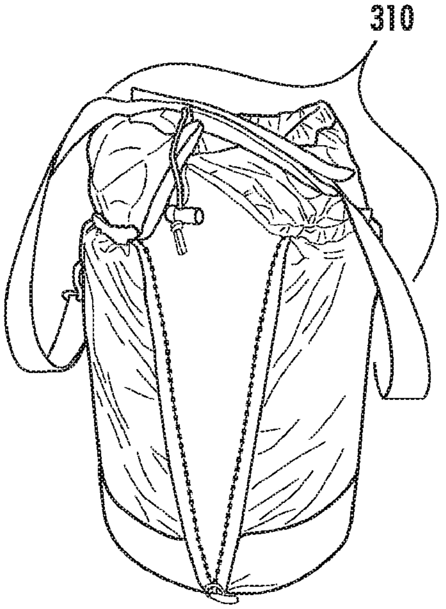
FIG. 4B illustrates a perspective view of a jacket for thermally regulating and dispensing a beverage according to one embodiment described herein.
Figure 4C:
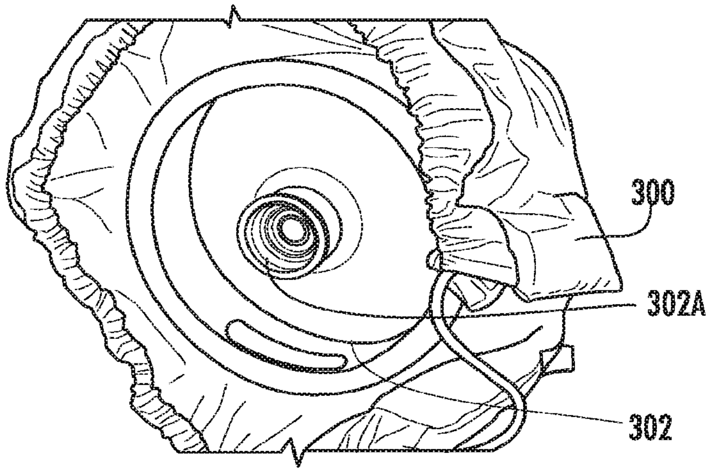
FIG. 4C illustrates a top perspective view of a beverage container disposed in a jacket according to one embodiment described herein.
Figure 4D:
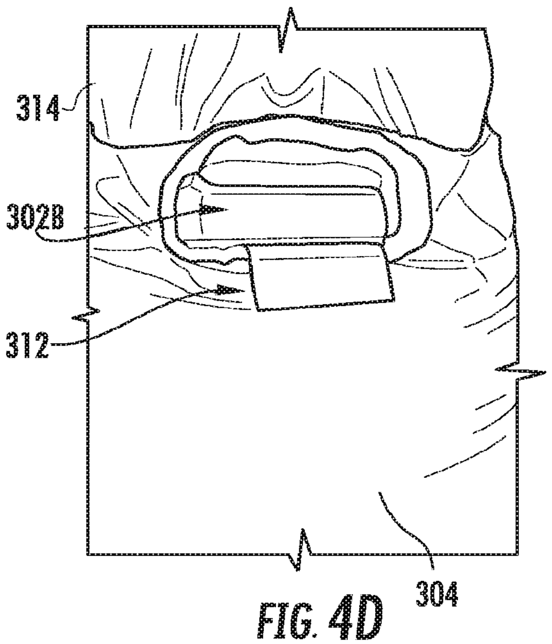
FIG. 4D illustrates a perspective view of a portion of a beverage container disposed in a jacket according to one embodiment described herein.
Figure 4E:
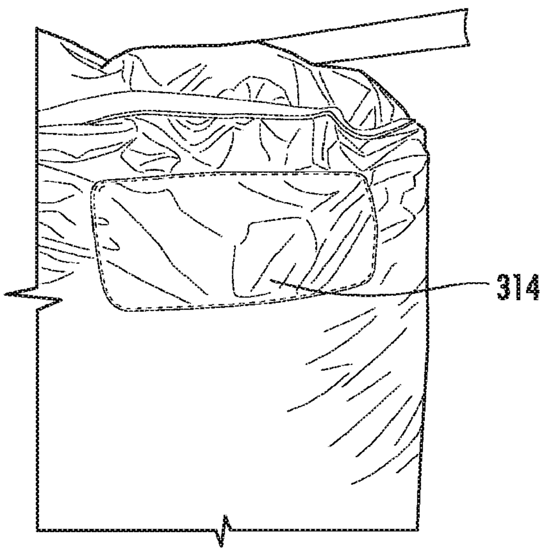
FIG. 4E illustrates a perspective view of a portion of a beverage container disposed in a jacket according to one embodiment described herein.
Figure 4F:
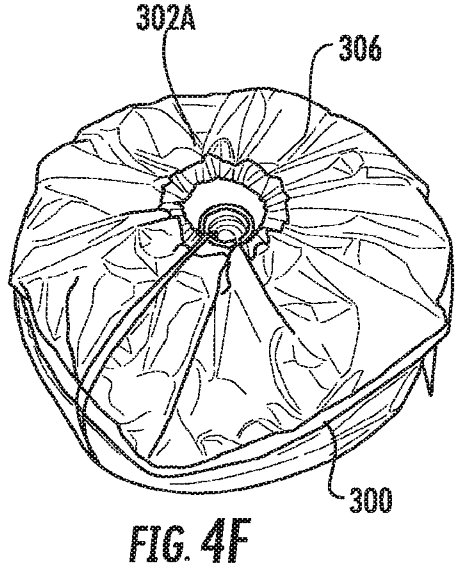
FIG. 4F illustrates a perspective view of a beverage container disposed in a jacket according to one embodiment described herein.

FIGS. 4A-4G are various views of jacket 300 according to exemplary embodiments set forth herein. FIG. 4A illustrates a beverage container (i.e., 302, FIG. 2) that is completely sealed within and/or covered by jacket 300 with the exception of the keg outlet 302A. Drawstring 306 is illustrated as being cinched around the beverage container. A closer view of drawstring 306 being cinched over container 302 is shown in FIG. 4F.

As FIG. 4B illustrates, jacket 300 can comprise an optional pair of straps 310 attached to the exterior fabric layer thereof. Straps 310 can improve the ability of a user to carry or transport a beverage container or jockey to a desired location. FIG. 4C depicts beverage container 302 in an interior space defined by jacket 300 prior to cinching a drawstring. An outlet 302A of beverage container 302 may be exposed outside of jacket 300 so it may be fluidly connected to a beverage jockey or tap.

As FIG. 4D illustrates, one or more openings 312 and/or flaps 314 can optionally be formed or disposed in jacket 300, which allows a user to easily access handles 302B of the beverage container disposed inside jacket 300. For example, one or more handles 302B disposed on a keg, a container that is a fraction of a keg, or other type of beverage container or dispenser can be accessed via folding the one or more flaps 314 open and exposing the handles through the openings 312 defined by flaps 314. FIG. 4D illustrates flaps 314 in an open position and FIG. 4E illustrates the flaps in a closed position. Flaps 314 can remain closed via VELCRO® or any other type of fastener (e.g., buttons, zippers, etc.), where desired, that is not inconsistent with the instant disclosure.

Figure 4G:
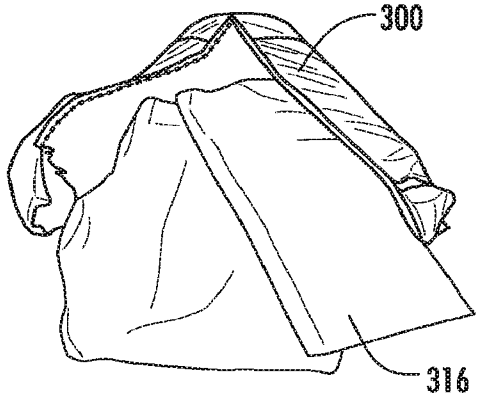
FIG. 4G illustrates a top perspective view of a jacket according to one embodiment described herein.

FIG. 4F illustrates a close up view of a beverage container disposed in jacket 304 and FIG. 4G illustrates an embodiment of a first PCM 316 that forms a first or second temperature control layer of jacket 300. As persons having skill in the art will appreciate, jacket 300 may include additional layers without departing from the scope of the instant disclosure. Multiple PCM layers, multiple insulating layers, or multiple reflecting layers are contemplated.

Example 3

Beverage Jockey for Thermally Regulating a Beverage Container and/or a Beverage FIGS. 5A-5D are various views of a beverage jockey or "jockey" 200 for thermally regulating and dispensing a beverage according to one embodiment described herein. Jockey 200 can comprise a container 202 having at least one inlet 204 (shown schematically, in broken lines as it is not readily apparent in the instant view) and at least one outlet 206. More than one inlet 204 and outlet 206 may be provided. For example, two outlets are shown plugged or sealed in FIG. 5A. Beverage jockeys 200 having one inlet/outlet; two inlets/outlets; three inlets/outlets; or between 1 and 10 inlets/outlets are contemplated. Each inlet/outlet may be fluidly connected via a conduit (see e.g., 210, FIG. 5C).

Figure 5A:
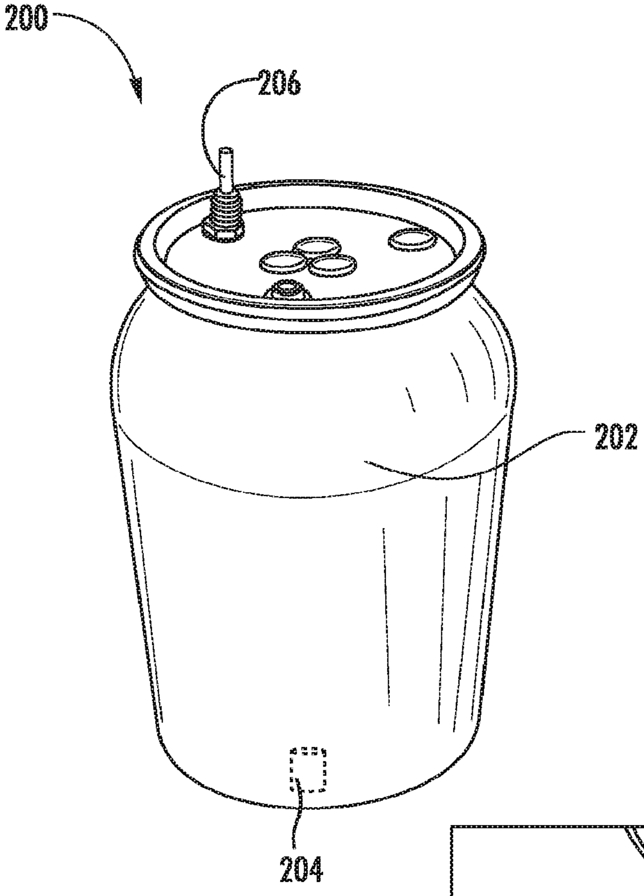
FIG. 5A illustrates a perspective view of a jockey for thermally regulating and dispensing a beverage according to one embodiment described herein.
Figure 5B:
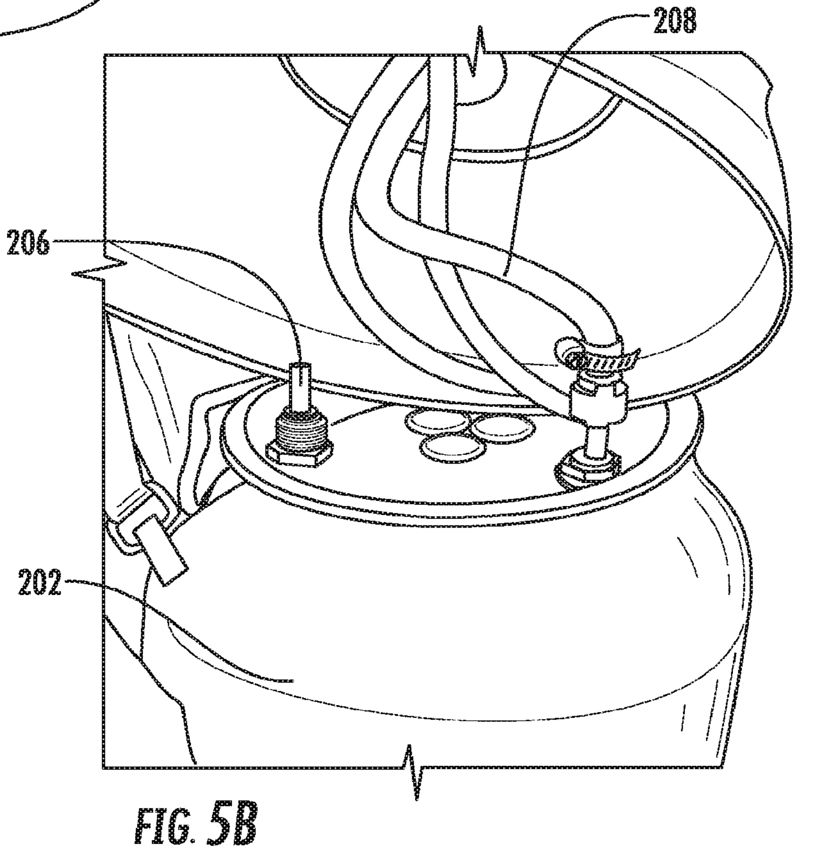
FIG. 5B illustrates a perspective view of a jockey for thermally regulating and dispensing a beverage according to one embodiment described herein.

FIG. 5B illustrates a cover (i.e., 212, FIG. 5D) being provided on or over jockey 200. The cover may include one or more taps (i.e., 214, FIG. 5D). As FIG. 5B illustrates, each outlet 206 can be fluidly connected to a conduit 208 comprising and/or connected to a beverage dispenser, such as a tap, nozzle, or spigot.

Figure 5C:
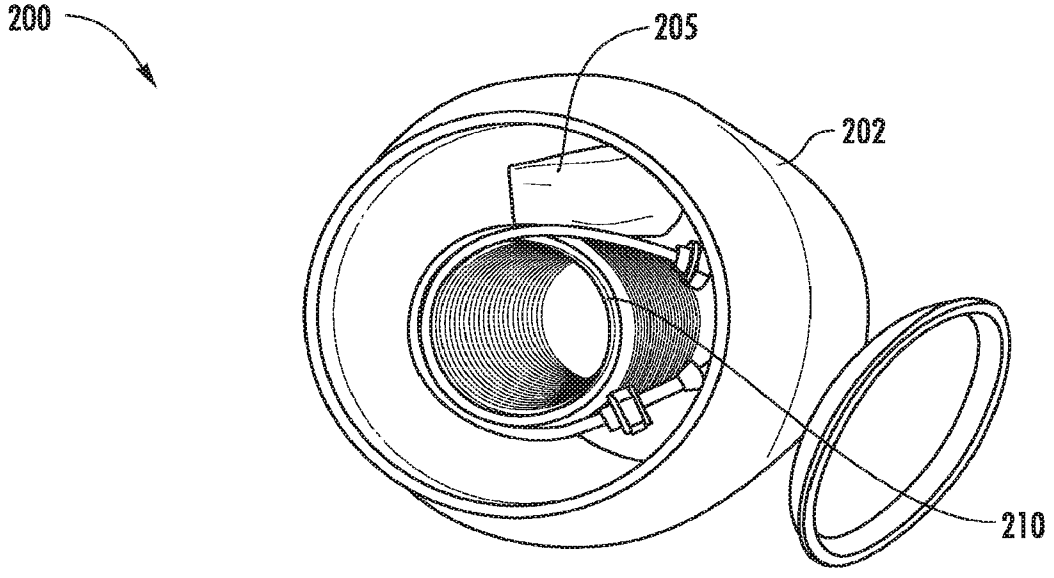
FIG. 5C illustrates a top perspective view of a jockey for thermally regulating and dispensing a beverage according to one embodiment described herein.

FIG. 5C depicts an interior chamber defined by jockey container 202. A conduit 210 is disposed inside container 202 between a respective inlet and outlet. A jockey PCM 205 is disposed in container 202 and in thermal contact with conduit 210. For illustrations purposes only, a small quantity of jockey PCM 205 is shown, however; a larger quantity and/or volume of the PCM 205 may be provided. In some embodiments, the jockey PCM 205 extends to the top of the container 202 and occupies a large volume of container 202 (e.g., at least 50% of the container volume, at least 60% of the container volume, or between 50 and 90% of the container volume). The jockey PCM 205 has a phase transition temperature that corresponds to a desired service temperature of a beverage received at jockey 200 inlet. The first phase transition temperature of the jockey PCM 205 can also correspond to a desired service temperature of a beverage flowing through conduit 210 and/or expelled from jockey 200 outlet.

Figure 5D:
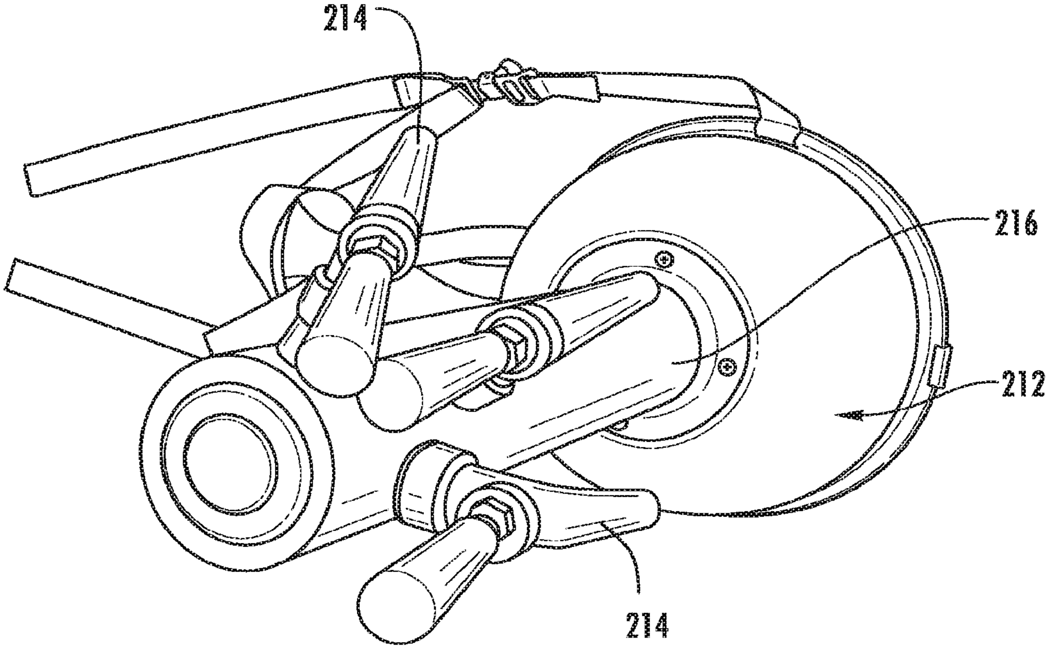
FIG. 5D illustrates a top perspective view of a portion of a jockey for thermally regulating and dispensing a beverage according to one embodiment described herein.

FIG. 5D illustrates a cover, generally designated 212 that can attach to and/or cover a portion of jockey 200. Cover 212 includes an optional fluid column or neck 216 and one or more taps 214 extending from neck 216. Although not shown, a PCM can also be disposed within the space defined by cover 212 and in thermal communication with the conduits therein (i.e., 208, FIG. 5B). A PCM can also be disposed within neck 216, or portions thereof.

Each tap 214 is in fluid communication with a jockey outlet (i.e., 206, FIG. 5A) for dispensing a beverage (e.g., beer). The beverage can flow from a beverage container (i.e., 302, FIG. 2) through beverage jockey 200 and out of a beverage system (e.g., 100, FIG. 1) via a tap 214. The beverage can be dispensed and served at a temperature that corresponds to the first phase transition temperature of the first PCM forming the interior temperature control layer (i.e., Q4, FIG. 3) and/or the phase transition temperature of jockey PCM 205. Multiple beverages may be dispensed via a single jockey 200, where desired, via one or more taps 214. That is, a single jockey 200 can be in fluid connection with multiple beverage containers (e.g., kegs, sixtels, etc.) in some embodiments.

Figure 6:
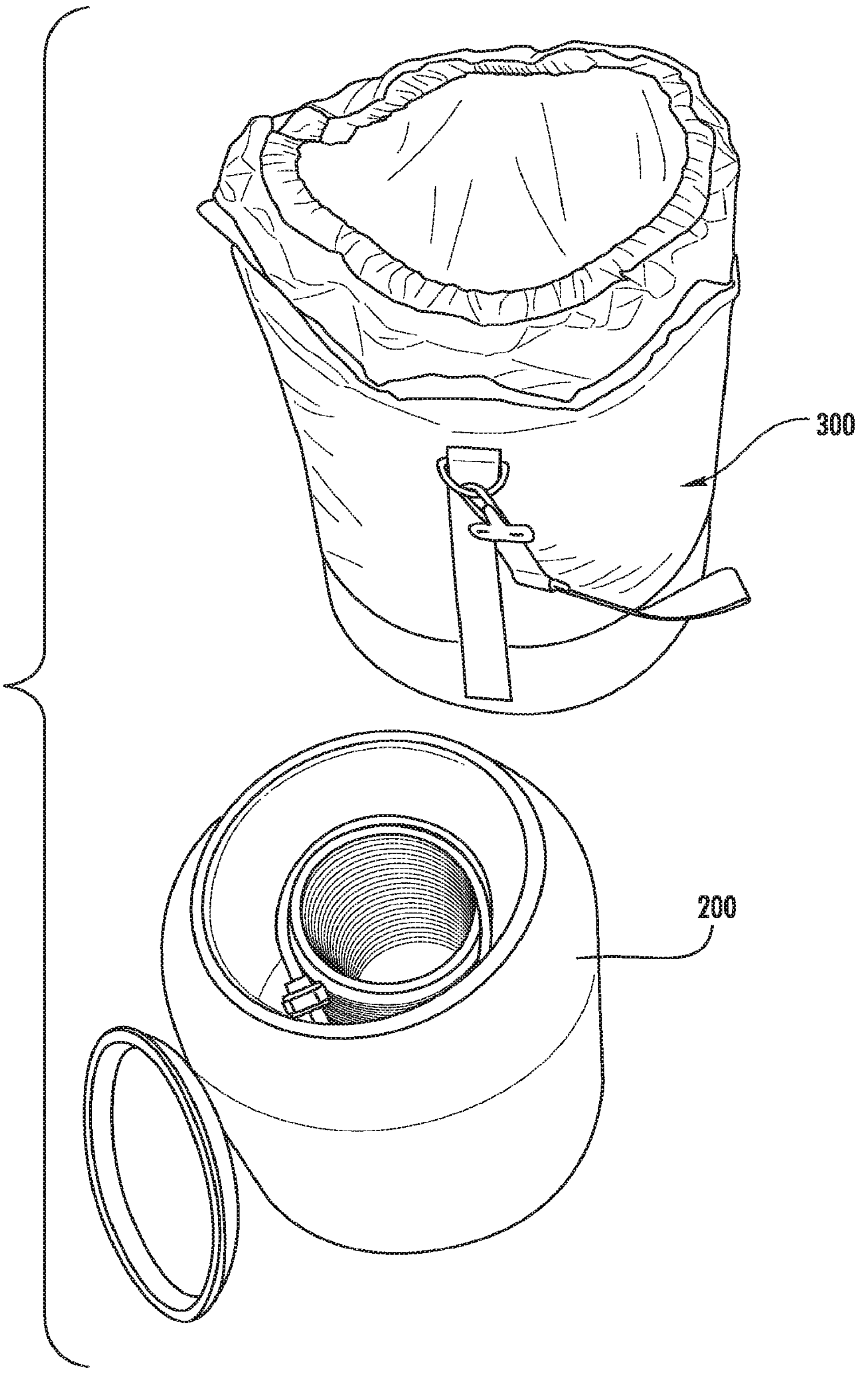
FIG. 6 illustrates a perspective view of a jockey and a jacket for thermally regulating and dispensing a beverage according to one embodiment described herein.

FIG. 6 is a view of a system comprised of a jockey 200 and jacket 300 for thermally regulating and dispensing a beverage according to one embodiment described herein. Jockey 200 can be disposed within an interior space defined by jacket 300. Jacket 300 can obviate the need of immersing a jockey in an ice bath, immersing a keg in an ice bath, and advantageously improve the rate at which the jockey 200 heats or cools.

Figure 7:
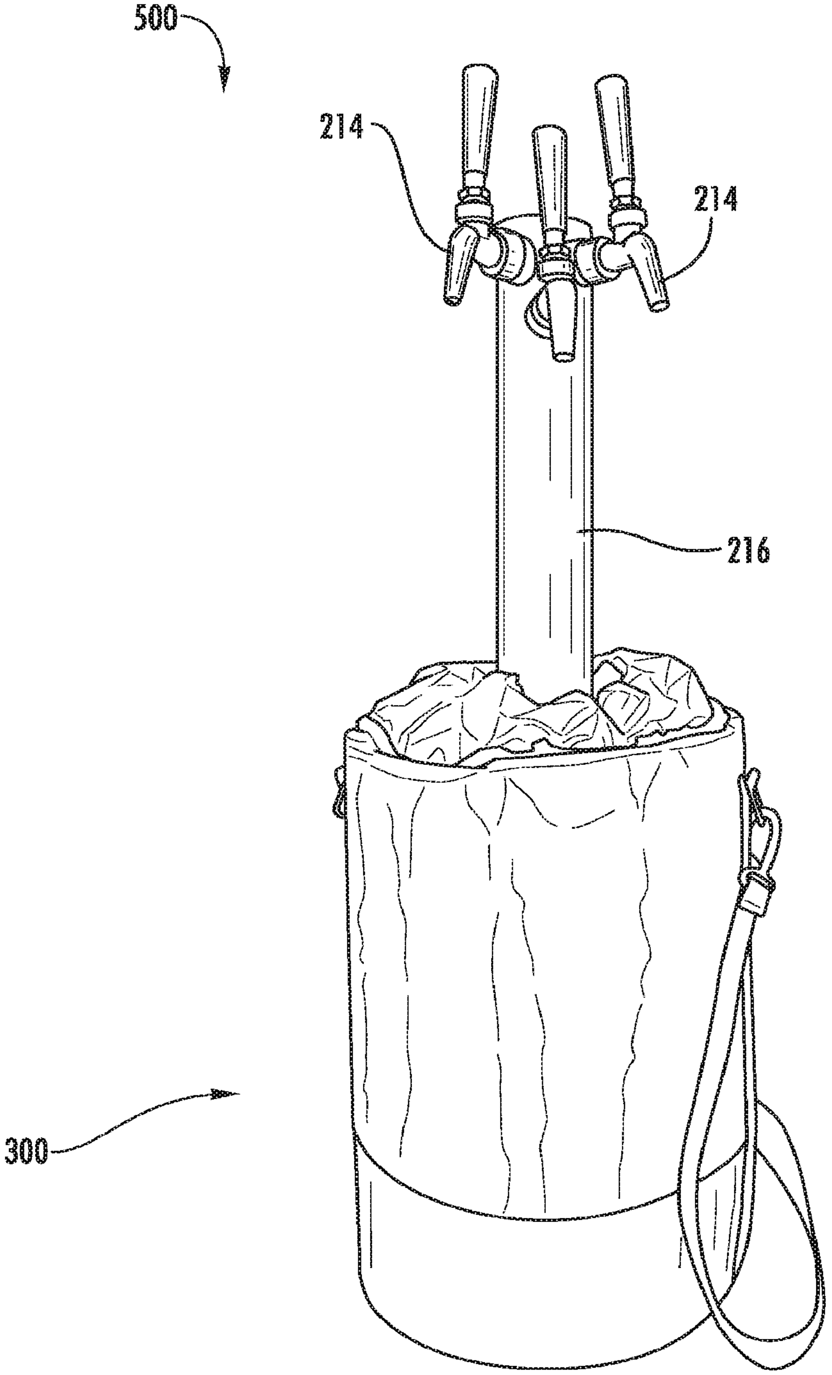
FIG. 7 illustrates a perspective view of a beverage container in a jacket that thermally regulates and dispenses a beverage according to one embodiment described herein.

FIG. 7 is a view of a beverage dispensing system 500 comprising a beverage container in a jacket 300. Jacket 300 thermally regulates the temperature at which one or more beverages are dispensed. The beverage container disposed in jacket 300 can comprise a jockey (i.e., 200, FIG. 5A) or a keg (e.g., 302, FIG. 2) and a beverage can be dispensed form the beverage container via one or more taps 214. Each tap 214 is in fluid communication with an outlet of the beverage container. System 500 can dispense multiple beverages at multiple Daffern service temperatures, where desired.

Example 4

Beverage Jockey and Jacket for Thermally Regulating One or More Beverages

Figure 8:
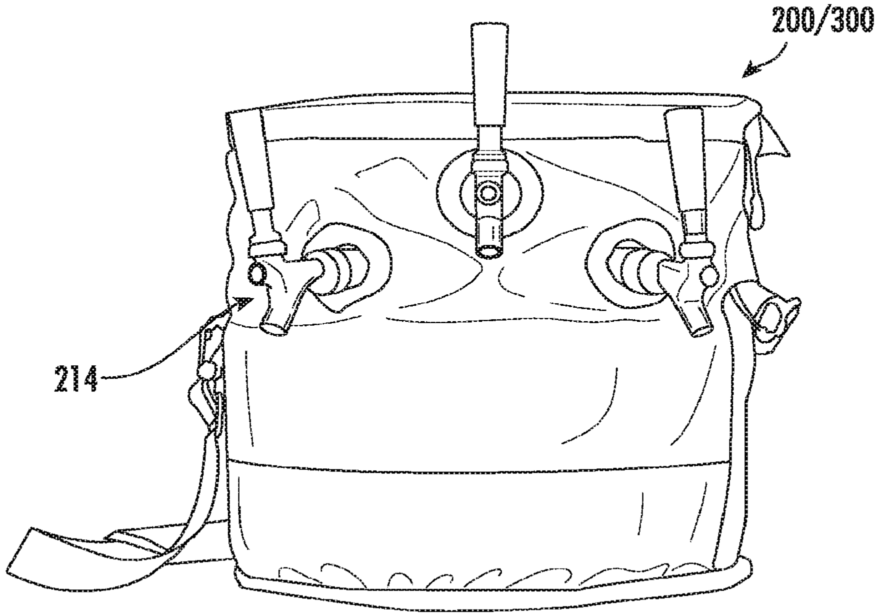
FIG. 8 illustrates a perspective view of a system comprising a jockey and a jacket for thermally regulating and dispensing one or more beverages according to one embodiment described herein.
Figure 9:
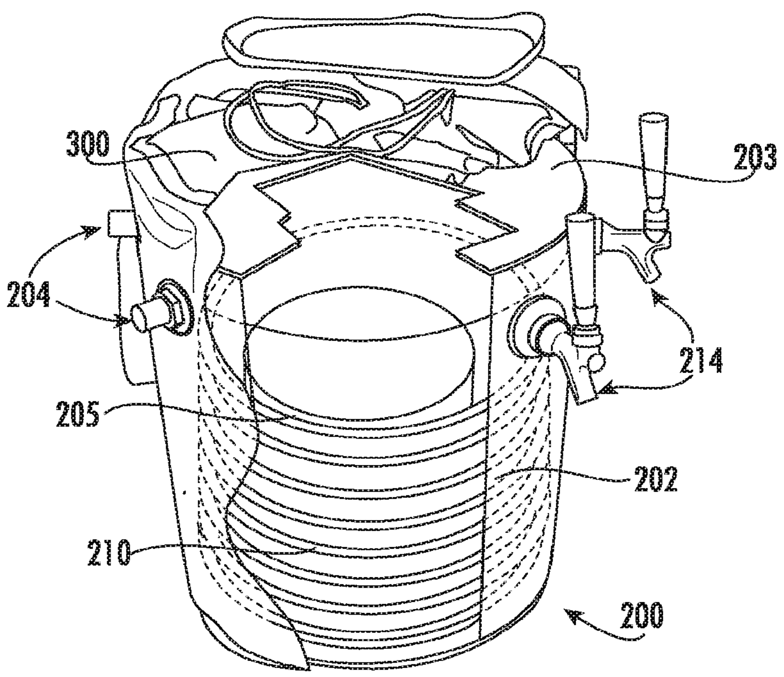
FIG. 9 illustrates a perspective, cutaway view of the system of FIG. 8.

FIGS. 8 and 9 illustrate views of a beverage jockey or "jockey" 200 for thermally regulating and dispensing one or more beverages according to one embodiment described herein. As illustrated in FIGS. 8 and 9, jockey 200 is disposed within jacket 300. Jockey 200 comprises a container 202 having a plurality of inlets 204 and a corresponding number of outlets in the form of taps 214. The inlet and outlet of a given "pair" are fluidly connected to one another via a conduit (see, e.g., 210).

The container 202 includes a screw-on cover or cap 203. Unlike in other embodiments described herein, the cover 203 does not include taps. Instead, the taps 214 are formed or disposed in the body of the container 202 itself. This configuration can provide an overall jockey system that is more compact than some other embodiments. It is also possible, in other cases, for taps and/or outlets to be placed in other locations.

A jockey PCM 205 is disposed in container 202 and in thermal contact with conduit 210. In this embodiment, the PCM 205 is a gelled PCM. As described previously, the jockey PCM 205 can extend to the top of the container 202 (or to the top of a subdivision or sub-compartment thereof, not shown, corresponding to the relevant conduit for the relevant inlet/outlet pair). Moreover, the jockey PCM 205 can occupy a large volume of container 202 or sub-compartment (e.g., at least 50% of the container or sub-compartment volume, at least 60% of the container or sub-compartment volume, or between 50 and 90% of the container or sub-compartment volume). The jockey PCM 205 has a phase transition temperature that corresponds to a desired service temperature of a beverage received at an inlet 204 of jockey 200 corresponding to a conduit 210 and a tap 214. It is further to be understood, as described in detail hereinabove in Example 3 and elsewhere, that this "set" of beverage, PCM, inlet, conduit, and outlet need not be the only "set" contained in the jockey 200 of FIGS. 8 and 9. It may be the case that all of the inlets and outlets of jockey 200 are used to serve the same beverages (or different beverages to be served at the same temperature), such that a single jockey PCM can be used to regulate the temperature of the fluids flowing into all inlets, through all conduits, and out of all taps. However, it is also possible for the jockey 200 to contain multiple subdivisions or sub-compartments (not shown in FIG. 9), each being associated with a different beverage or service temperature, a different inlet, a different conduit, and a different tap.

FIG. 8 is a view of the system including jockey 200 and jacket 300 for thermally regulating and dispensing one or more beverages. The jockey 200 is disposed within an interior space defined by jacket 300. The use of jacket 300 can obviate the need to immerse the jockey in an ice bath (for service of cold beverages, for instance) and can advantageously improve the rate and/or efficacy at which the jockey 200 regulates or maintains a desired temperature or even heats or cools a beverage.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

What is claimed is:

1. A beverage jockey comprising:

(a) a container having an inlet and an outlet and subdivided into a plurality of internal sub-compartments with a plurality of conduits disposed in the internal sub-compartments between the inlet and the outlet such that a beverage received at the inlet of the jockey passes through the conduits to the outlet for dispensing from the outlet of the jockey; and (b) a plurality of phase change materials (PCMs) other than ice disposed in the plurality of subcompartments, wherein (i) a first PCM having a first phase transition temperature is disposed in a first subcompartment of the container, (ii) a second, different PCM having a second, different phase transition temperature is disposed in a second subcompartment of the container, and (iii) a third, different PCM having a third, different phase transition temperature is disposed in a third subcompartment of the container;

(c) wherein the container is disposed in a jacket, the jacket comprising an internal temperature control layer and an external fabric layer; and (d) wherein the internal temperature control layer is disposed adjacent to the container and comprises a fourth PCM having a fourth phase transition temperature that is the same as the first phase transition temperature of the first PCM.

2. The beverage jockey of claim 1, wherein the first phase transition temperature is between 40-44° F.; the second phase transition temperature is between 36-38° F.; and the third phase transition temperature is between 33-36° F.

3. The beverage jockey of claim 1, wherein each PCM comprises a paraffin, polymeric material, salt hydrate, fatty acid, alkyl ester of a fatty acid, fatty carbonate ester, sulfonate, or phosphonate, fatty alcohol, or a mixture thereof.

4. The beverage jockey of claim 1, wherein the inlet is connected to a keg or a sixtel keg.

5. The beverage jockey of claim 1, wherein the outlet comprises a tap.

* * * * *